United States Patent
Kondo et al.

[11] Patent Number: 5,605,401
[45] Date of Patent: Feb. 25, 1997

[54] ROLLING CONTACT BEARING

[75] Inventors: Hiromitsu Kondo; Michiyoshi Ishimaru, both of Kuwana, Japan

[73] Assignee: NTN Corporation, Osaka-fu, Japan

[21] Appl. No.: 551,245

[22] Filed: Oct. 31, 1995

[30] Foreign Application Priority Data

Oct. 31, 1994 [JP] Japan .................................. 6-266845
Jan. 31, 1995 [JP] Japan .................................. 7-014279

[51] Int. Cl.⁶ .................................................. F16C 19/06
[52] U.S. Cl. .................................... 384/492; 384/909
[58] Field of Search .................................. 384/492, 909, 384/527, 576, 569, 565

[56] References Cited

U.S. PATENT DOCUMENTS 5,117,742  6/1992  Iida ........................................ 277/136
5,218,757  6/1993  Kaneko et al. ............................ 29/855
5,506,079  4/1996  Grigoryan et al. ....................... 430/106

*Primary Examiner*—Lenard A. Footland
*Attorney, Agent, or Firm*—Nikaido, Marmelstein, Murray & Oram LLP

[57] ABSTRACT

The outer ring 3 is formed of COPNA resin. The inner ring 1 and balls 4 are formed of martensitic stainless steel SUS440C or the like, and the retainer 5 is formed of SUS304 or the like.

6 Claims, 6 Drawing Sheets

The clean life of the comparative article is taken as unity, and the arrow indicates that the life is continuing.

FIG. 11

Unit: relative number of units

| Particle diameter (μm) | 0.38-0.5 | 0.5-0.7 | 0.7-1.0 | 1-2 | 2-(20) | 0.5-(20) | Total number |
|---|---|---|---|---|---|---|---|
| hour | | | | | | | |
| 10 | 1 | 0 | 0 | 0 | 0 | 0 | 1 |
| 20 | 0 | 0 | 0 | 0 | 0 | 0 | 0 |
| 30 | 0 | 1 | 0 | 0 | 0 | 1 | 1 |
| 40 | 0 | 0 | 0 | 0 | 0 | 0 | 0 |
| 50 | 1 | 0 | 0 | 0 | 1 | 1 | 2 |
| 60 | 2 | 0 | 0 | 0 | 0 | 0 | 2 |
| 70 | 0 | 0 | 0 | 0 | 0 | 0 | 0 |
| 80 | 2 | 0 | 0 | 0 | 0 | 0 | 2 |
| 90 | 0 | 0 | 0 | 0 | 0 | 0 | 0 |
| 100 | 0 | 0 | 0 | 0 | 0 | 0 | 0 |
| 110 | 1 | 0 | 1 | 0 | 0 | 1 | 2 |
| 120 | 0 | 0 | 0 | 0 | 0 | 0 | 0 |
| 130 | 1 | 0 | 0 | 0 | 0 | 0 | 1 |
| 140 | 0 | 0 | 0 | 0 | 0 | 0 | 0 |
| 150 | 0 | 0 | 0 | 0 | 0 | 0 | 0 |
| | 8 Subtotal | 1 | 1 | 0 | 1 | 3 Subtotal | 11 Total number |

ROLLING CONTACT BEARING

BACKGROUND OF THE INVENTION

The present invention relates to a rolling contact bearing which is suitable for use in a special environment where lubricants, such as grease or oil, cannot be used, particularly in a high temperature clean environment and in a clean environment.

For example, in the field of semiconductor production, the line width of electric circuit is becoming smaller as the degree of integration of semiconductors increases, forming a trend toward a laminar structure (2-story). Thus, in the sputtering process and so on, wafers have come to be treated at higher temperature (up to about 500° C.). For this reason, bearings disposed in wafer transfer systems or the like are expected to be heated to about 400° C., causing fears of the lubricating property of the lubricant being lowered owing to its high temperature deterioration, the bearing life being thereby decreased, and the bearing inner clearance becoming too large or too small owing to thermal expansion of the bearing components, which phenomena adversely affect such properties of the bearing as durability and low dust producing property.

Further, the recent advance in the degree of device integration has resulted in a high level standardization of the degree of cleanness of clean rooms, requiring that bearings used in such clean environment have a particularly desirable low dust producing property.

At present, there is no bearing available which can be used and exhibits good durability in said high temperature clean environment or in an environment where the ambient temperature is not so high but where a high degree of cleanness is required.

In this connection it is to be noted that in said high temperature special environment, the reason for the fear that the lubricating property of the bearing would be lowered is as follows: Whereas as lubricants for bearings which are run in a highly clean vacuum environment, such as one found in semiconductor production facilities, use is often made of solid lubricants of high polymers, such as PTFE, with which the bearings are coated. However, since these high polymers have relatively low heat resistance temperatures (for example, about 320° C. even for PTFE, which is superior in heat resistance), in an environment where the bearing temperature is expected to exceed the heat resistance temperature of solid lubricants, there is a possibility that they fail to perform their functions as lubricants. On the other hand, soft metals, such as gold, silver and lead or laminar materials, such as molybdenum disulfide, produce a relatively large amount of dust and are inferior in durability in the atmosphere. Therefore, in a device, such as a wafer transfer device, which frequently traverses between atmosphere and vacuum, there is a fear of the bearing life being shortened.

As for bearings which are used in a high temperature clean environment, it is insufficient to simply secure heat resistance for the bearing components themselves; it is necessary to take measures by paying due considerations to lubricating property, low dust producing property, and operability in both atmosphere and vacuum. If the ambient temperature is not so high, lubricating property, low dust producing property and operability in both atmosphere and vacuum become important characteristics.

SUMMARY OF THE INVENTION

From the above points of view and with cost performance taken into consideration, the present invention provides a rolling contact bearing suitable for use in a special environment where fluid lubricants, such as grease and oil, cannot be used, particularly in a high temperature clean environment and in a clean environment.

In the present invention, at least one of the components having a contact surface subjected to rolling friction or sliding friction is formed of COPNA resin. As for components to be formed of COPNA resin, the retainer, at least one of the plurality of balls or at least one of the inner ring and outer ring may be selected as such component.

In the case where at least one of the inner ring and outer ring is formed of COPNA resin, the balls are preferably made of stainless steel or ceramic material. In this case, the bearing type may be the full ball type having no retainer.

Further, components may be made by using COPNA resin which contains at least either PTFE or graphite as a filler.

Herein, the "COPNA resin" is a thermosetting resin prepared by crosslinking a polycyclic aromatic hydrocarbon, such as naphthalene, anthracene, phenanthrene, pyrene or coal tar pitch, by paraxylylene glycol in the presence of an acid catalyst. The reaction proceeds in the form of a parent electron substitution reaction involving deydration, forming a structure in which a number of condensed polycyclic aromatic nuclei are connected together by pencil type bonds, the product being named "Condensed Polynuclear Aromatic Resin". With the underlined characters put together, it is abbreviated to "COPNA resin".

Copna resin is superior in heat resistance, slide characteristic, mechanical characteristics and chemical resistance and has easy processability and cost performance. Copna resin is now marketed under the trade name of "SK resin" by Sumikin Kako Co. Ltd.

As regards heat resistance, whereas phenol resins and polyimide resins, which are superior in heat resistance, start to decrease in weight at temperatures of 300° C. to 350° C., COPNA resin (SK resin) does not start to decrease in weight until 400° C., indicating that i t is extremely superior in resistance to thermal decomposition.

As regards slide characteristic, the limit PV value is 2,000 $kgf/cm^2 \cdot cm/s$ for a material having no filler added thereto and 2,800–4,400 $kgf/cm^2 \cdot cm/s$ for a composite material having PTFE or graphite added thereto. Further, it has been ascertained that the limit PV value for heat treated articles is as high as 6,250 $kgf/cm^2 \cdot cm/s$, exhibiting a superior slide characteristic which is of substantially the same as that for polyimide composite materials whose values are 4,500–5,500 and which are superior in slide characteristic.

As regards a specific amount of wear, it is about 0.02 $mm^2/kgf \cdot km$ for a material having graphite added thereto, indicating that the material is very superior in wear resistance.

As regards easy processability, since it exhibits sufficient fluidity at about 100° C., it can be subjected to laminated molding as well as to transfer molding and can be molded under substantially the same conditions as those for phenol resins and mass production is conceivable.

Heat resistance, lubricating property and durability can be simultaneously secured for bearings by forming, of said COPNA resin, the components having contact surfaces subjected to rolling friction or sliding friction. The superior self-lubricating action of COPNA resin makes unnecessary the use of lubricants, such as PTFE, which means that there is no fear of lubricants being decreased in lubricating property owing to high temperature deterioration. Further, it is low in dust producing property. As for low dust producing property, very high cleanness less than Class 10 can be achieved and since such high cleanness lasts for a long time, the bearing is most suitable for use in clean rooms. Furthermore, COPNA resin is a substance which is stable in the atmosphere, so that even if it is used in a device which is repeatedly moved between atmosphere and vacuum, there is no fear about durability or about the dust producing property being increased.

Further, since mass production based on injection molding is possible, the resin is also cost-effective. Particularly, in the case where components of complicated shape, such as retainers, are injection molded using COPNA resin, cost performance is very high as compared with the case where resins, such as polyimides, which cannot be injection molded, are machined.

When components are to be formed of COPNA resin, in consideration of required characteristics, such as precision, cost and matching with environment, the retainer, at least one of the plurality of balls, or at least one of the inner ring and outer ring may be suitably selected as such component; thus, careful measures conforming to the required conditions can be taken. Further, in the case where at least one of the inner ring and outer ring is formed of COPNA resin, the balls may be formed of stainless steel or ceramic material and the bearing may be constructed in the full ball type having no retainer. These arrangements may be suitably selected according to said required conditions.

The use of a COPNA resin which has at least either PTFE or graphite added thereto as a filler further improves lubricating property. Further, if a COPNA resin having graphite added thereto is used, an antistatic characteristic can be obtained.

BRIEF DESCRIPTION OF THE DRAWINGS

FIG. 11 is a table showing the result of a dust producing test conducted on the rolling contact bearing shown in FIG. 5.

DESCRIPTION OF THE PREFERRED EMBODIMENT

Embodiments of the present invention will now be described.

Figure 1:
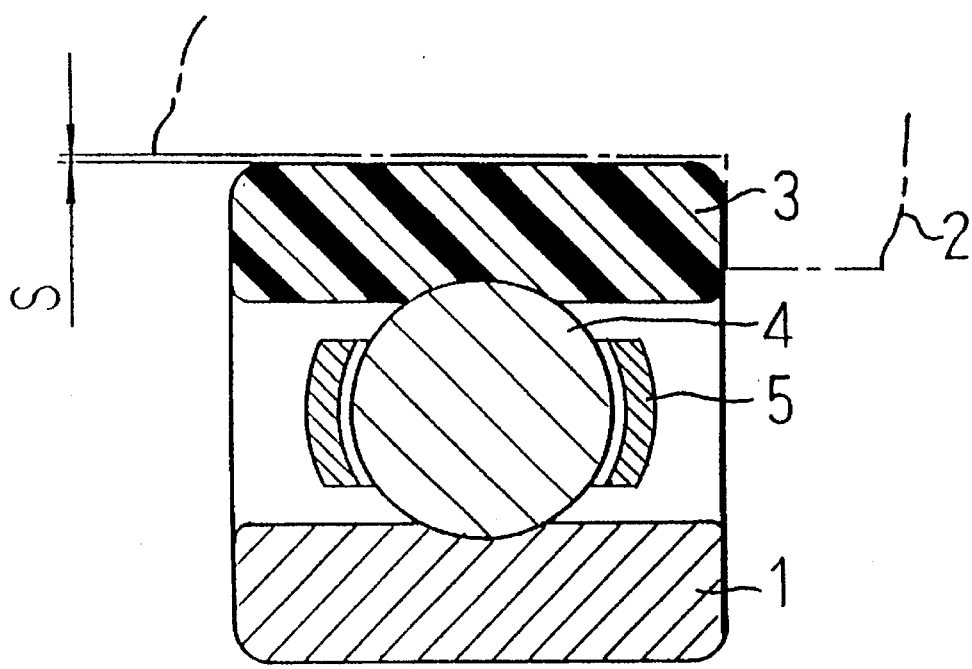
FIG. 1 is a sectional view showing an embodiment of the present invention.

An embodiment shown in FIG. 1 shows the present invention applied to a deep groove ball bearing. This bearing is to be incorporated into the wafer transfer system of a sputtering device in the semiconductor producing process, and comprises an inner ring 1 to be fitted on an unillustrated rotatable shaft, an outer ring 3 to be fitted in the fitting surface, e.g., of a housing 2 with a loose fit clearance S (at ordinary temperature; in the figure, the clearance is shown considerably exaggerated), a plurality of balls disposed between the inner ring 1 and outer ring 3, and a retainer 5 for retaining the balls 4 at equal circumferential intervals.

The outer ring 3 is formed of COPNA resin (SK resin produced by Sumikin Kako) described above. The inner ring 1 and balls 4 are formed of martensitic stainless steel, e.g., SUS440C, and the retainer 5 is formed of SUS304 or the like. In addition, bearings used in the wafer transfer system in semiconductor production facilities are run generally under light-weight low speed conditions; therefore, even if the outer ring 3 is formed of COPNA resin, it can endure usage as considered from the viewpoint of strength.

In this bearing, since outer ring 3 formed of COPNA resin having self-lubricating property serves as a lubricant, there is no need to use a lubricant, such as PTFE. That is, contact with the balls 4 results in the COPNA res in being rolling-wise fed from the outer ring 3 to the surfaces of the balls 4 and also to the raceway surface of the inner ring 1 and the pocket wall surface of the retainer 5, so that sufficient lubrication is ensured between the inner ring 1 and the balls 4 and between the balls 4 and the retainer 5. Therefore, in this bearing, there is no fear of high temperature deterioration or exhaustion of the lubricant. Furthermore, since COPNA resin is also a material which is superior in wear resistance, it hardly produces excessive lubricant powder not taking part in forming a rolling-wise applied film, and is low in dust producing property. Further, COPNA resin is also a substance which is stable when left in the atmosphere, so that even if it is incorporated into a wafer transfer system which repeatedly traverses between atmosphere and vacuum, as in this embodiment, it exhibits superior durability and low dust producing property. In addition, if it is simply subjected to high temperature, measures could be taken by forming all of the bearing components of stainless steel or the like; however, high temperature deterioration of the lubricant would lower the durability and increase the amount of dust produced.

Further, in this embodiment, in order to facilitate mounting and dismounting of the bearing, there is defined a loose fit clearance S (at ordinary temperature); however, since the operation is a light-weight low speed one, such clearance does not become a problem.

Figure 2:
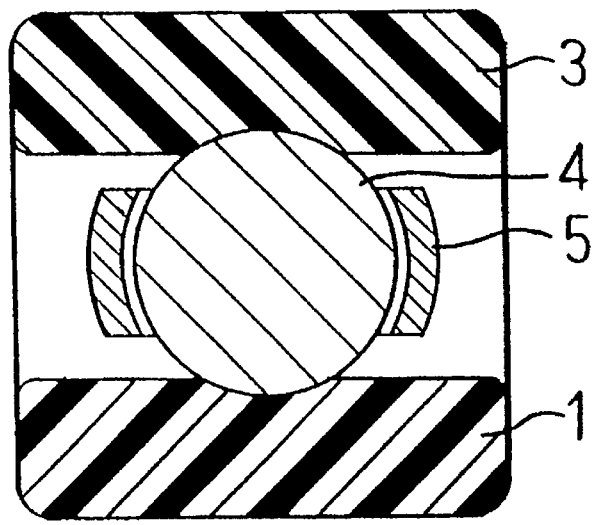
FIG. 2 is a sectional view showing another embodiment of the present invention.

In an embodiment shown in FIG. 2, both of the inner ring 1 and outer ring 3 are formed of COPNA resin. As compared with the bearing shown in FIG. 1, i t is further improved in lubricating property. In order to provide heat resistance, it is preferable to form the balls 4 of stainless steel or ceramic material. In addition, if the inner ring and outer ring are formed of COPNA resin having graphite added thereto as a filler, an antistatic characteristic is obtained, so that they can be used as part of the circuit when grounding is required.

Figure 3:
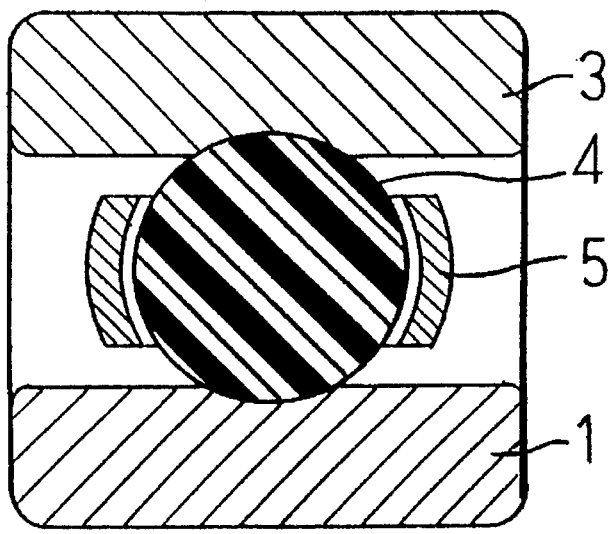
FIG. 3 is a sectional view showing another embodiment of the present invention.

In an embodiment shown in FIG. 3, the balls 4 are formed of COPNA resin.

Figure 4:
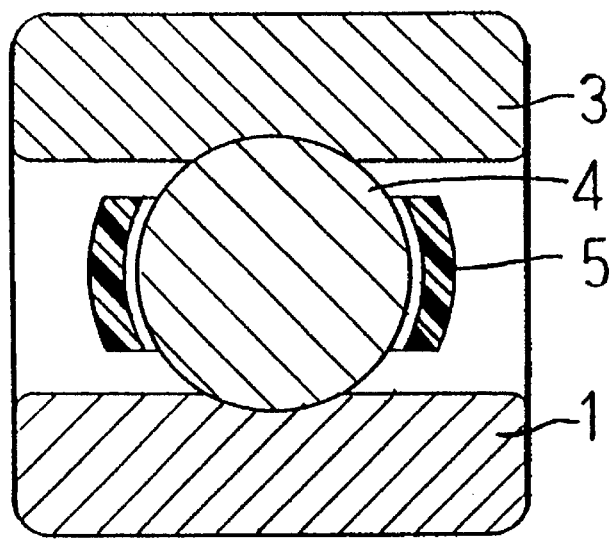
FIG. 4 is a sectional view showing another embodiment of the present invention.

In an embodiment shown in FIG. 4, the retainer 5 is formed of COPNA resin. The contact between the retainer 5 and the balls 4 results in the COPNA resin being rolling-wise fed to the surfaces of the balls 4 and also to the raceway surfaces of the inner ring 1 and outer ring 3, thereby providing satisfactory lubrication. Copna resin, unlike polyimides and the like, can be injection-molded and allows mass production of members, even if the latter are complicated in shape, such as the retainer 5; thus, it is very cost-effective.

Figure 5:
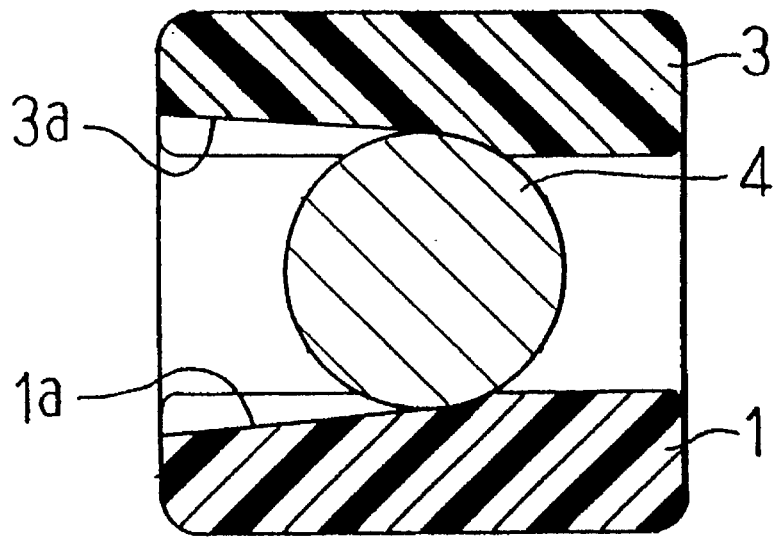
FIG. 5 is a sectional view showing another embodiment of the present invention.

In an embodiment shown in FIG. 5, both of the inner ring 1 and outer ring 3 are formed of COPNA resin and the retainer 5 is omitted to provide the full ball type. To secure heat resistance, it is preferable to form the balls 4 of stainless steel or ceramic material. Since the number of balls 4 to be incorporated can be increased, the load bearing capacity is improved. In addition, in this embodiment, both the outer surface of the inner ring 1 and the inner surface of the outer ring 3 are formed with insertion grooves 1a and 3a for inserting the balls 4 in the raceway surfaces of the inner ring and outer ring 3. Even if the size of the insertion grooves 1a and 3a is a little smaller than the diameter of the balls 4, the elastic deformation of the inner ring and outer ring allows easy insertion of the balls 4. Further, the machining of the insertion grooves 1a and 3a is also easy.

Figure 6:
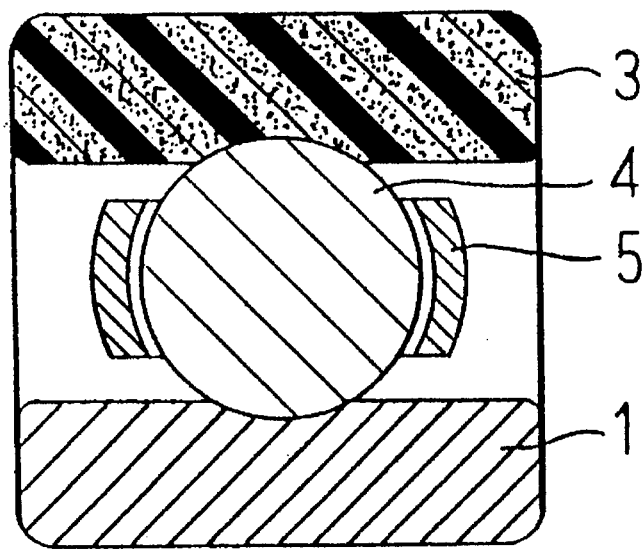
FIG. 6 is a sectional view showing another embodiment of the present invention.

In an embodiment shown in FIG. 6, the outer ring 3 is formed of COPNA resin having PTFE or graphite (or PTFE and graphite) added thereto. The addition of PTFE and/or graphite further improves lubricating property.

Figure 7:
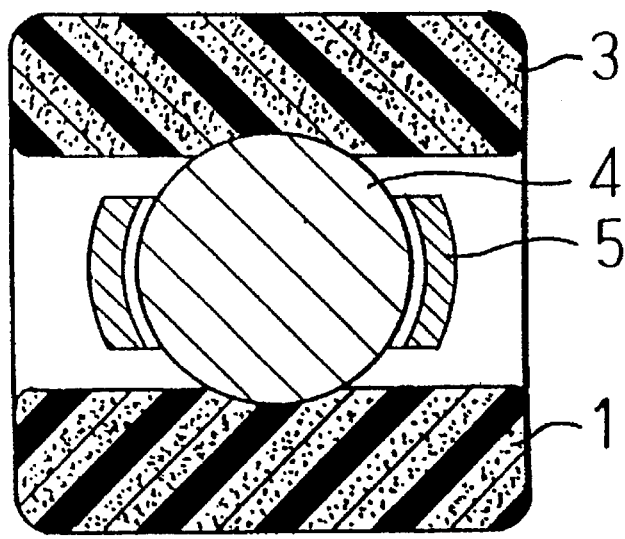
FIG. 7 is a sectional view showing another embodiment of the present invention.

In an embodiment shown in FIG. 7, both of the inner ring and outer ring 3 are formed of COPNA resin having PTFE or graphite (or PTFE and graphite) added thereto. The lubricating property is further improved. The bearing may be constructed as the full ball type shown in FIG. 5.

In accordance with the arrangements shown in FIGS. 3 and 4, the balls 4 and retainer 5 may be formed of COPNA resin having PTFE or graphite (or PTFE and graphite) added thereto.

Figure 8:
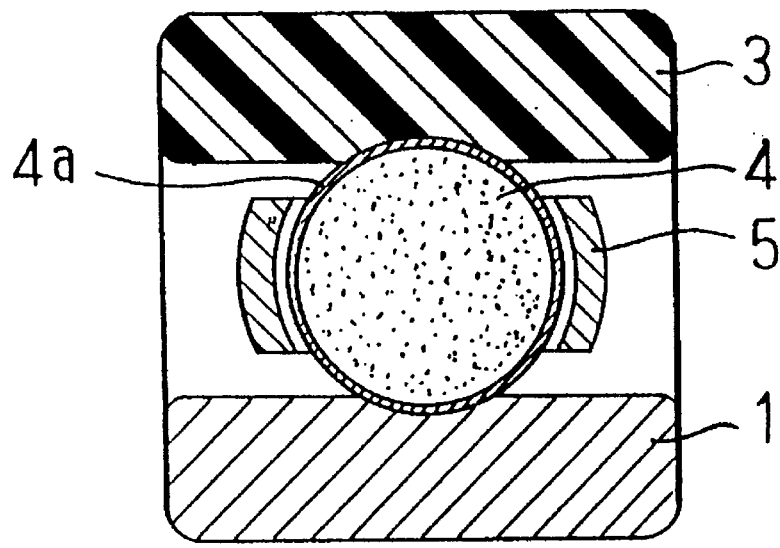
FIG. 8 is a sectional view showing another embodiment of the present invention.

In an embodiment shown in FIG. 8, the outer ring 3 is formed of COPNA resin and the balls 4 of ceramic material. Since ceramic material is lower in linear expansion coefficient than stainless steel, the formation of the balls 4 of ceramic material effectively prevents the bearing inner clearance from becoming too small during temperature rise. In addition, if the temperature during operation is about 300° C., as shown in the figure, it is possible to further improve the lubricating property by forming solid lubrication films 4a of PTFE at least on the surfaces of the balls 4 (they may also be formed on the raceway surfaces of the inner ring 1 and outer ring 3). The arrangement of this embodiment may be used in combination with those shown in FIGS. 1 through 7.

Figure 9:
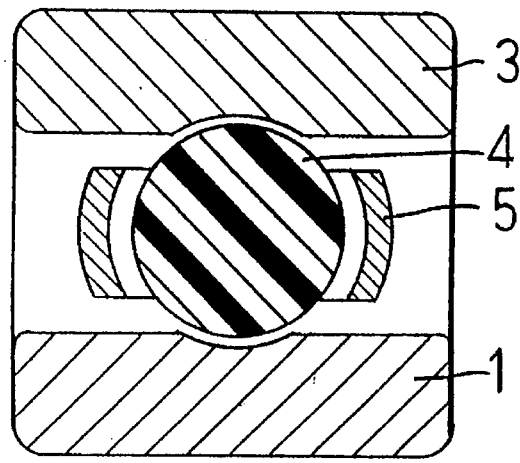
FIG. 9 is a sectional view showing another embodiment of the present invention.

In an embodiment shown in FIG. 9, at least one ball 4 is designed as a no-load ball with no load applied thereon (it is slightly smaller in diameter than the other balls), the no-load ball being formed of COPNA resin. The other balls 4 are formed of martensitic stainless steel or the like. In this arrangement, the no-load ball 4 made of COPNA resin serves as a lubricant supply source.

Figure 10:
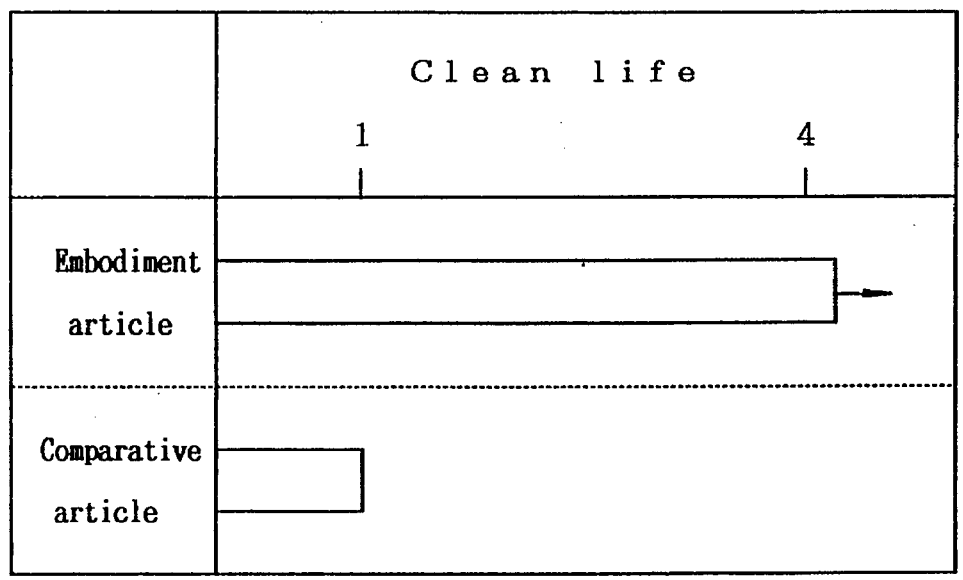
FIG. 10 is a graph showing the result of a clean life test conducted on the rolling contact bearing shown in FIG. 5.

The rolling contact bearing of the full ball type shown in FIG. 5 (an embodiment article: t he COPNA resin has graphite added there to) and a rolling contact bearing (comparative article) using as a solid lubricant a PTFE whose average molecular weight is less than 5,000 were tested for their cleanness and it was found that in both cases the cleanness did not exceed Class 10, indicating good values. Further, with an increased thrust load (about 30N), the duration of said cleanness (clean life) was measured and it was found that as shown in FIG. 10, the present embodiment article indicated more than 4 times the value for the comparative article (the test was suspended).

FIG. 11 shows the result of dust producing tests conducted on the rolling contact bearing of the full ball type shown in FIG. 5. As shown in the figure, the total number of relatively produced dust after the lapse of 150 hours (operating time) was 11, indicating low dust producing property. As a comparative example, a bearing of the same type using polyimide was produced and was tested for dust producing property under the same conditions, it being found that the total number of relatively produced dust was over 100 after the lapse of 150 hours (operating time).

What is claimed is:

1. A rolling contact bearing characterized in that at least one of the components having a contact surface subjected to rolling friction or sliding friction is formed of condensed polynuclear aromatic resin.

2. A rolling contact bearing as set forth in claim 1, wherein the retainer is formed of condensed polynuclear aromatic resin.

3. A rolling contact bearing as set forth in claim 1, wherein at least one of the plurality of balls is formed of condensed polynuclear aromatic resin.

4. A rolling contact bearing as set forth in claim 1, wherein at least one of the inner ring and outer ring is formed of condensed polynuclear aromatic resin and the balls are formed of stainless steel or ceramic material.

5. A rolling contact bearing as set forth in claim 4, wherein the rolling contact bearing is of the full ball type having no retainer.

6. A rolling contact bearing as set forth in claim 1, or claim 2, or claim 3, claim 4, or claim 5 wherein said condensed polynuclear aromatic resin contains at least either PTFE or graphite as a filler.

\* \* \* \* \*